United States Patent [19]
Knoll

[11] 3,742,620
[45] July 3, 1973

[54] METHOD FOR CONSTRUCTING THREE-DIMENSIONAL MODELS AND DEVICE THEREFOR

[75] Inventor: Ernst Knoll, Vlotho, Weser, Germany

[73] Assignee: Relief-Technik GmbH, Chur, Switzerland

[22] Filed: Jan. 19, 1972

[21] Appl. No.: 218,961

Related U.S. Application Data

[63] Continuation-in-part of Ser. No. 889,111, Dec. 30, 1969, abandoned.

[52] U.S. Cl. ........................................ 35/41, 35/26
[51] Int. Cl. ...................... G09b 25/06, G09b 29/12
[58] Field of Search .................................. 35/41, 26

[56] References Cited
UNITED STATES PATENTS

| | | | |
|---|---|---|---|
| 1,351,392 | 8/1920 | Manheimer | 35/41 |
| 2,139,592 | 2/1940 | Perera | 35/41 |
| 2,309,627 | 2/1943 | Cooke et al. | 35/41 |
| 2,335,941 | 12/1943 | Howard | 35/26 |

Primary Examiner—Wm. H. Grieb
Attorney—Thomas Cifelli, Jr. et al.

[57] ABSTRACT

There is provided an apparatus and method of using said apparatus for demonstrating the inter-relationship of a landscape, and the contour lines representing said landscape in two- and three-dimensional representation.

In the method of three-dimensional sand or clay model of a landscape is produced, a transparent plate is supported over and free from said model and contour lines connecting points of the same height on the model are drawn upon the said plate using a substantially ablative transfer material, said contour lines are transferred onto transfer receiving material slabs and layers of said material corresponding to said contour lines are produced by cutting along said contour lines. The contour slabs are then stacked upon each other to give a three-dimensional representation of the model.

In a further modification, the contour slabs are colored in such a manner that at least adjacent slabs are of a different color.

Upon compression of the contour model by a transparent plate, a two-dimensional contour representation is again visible.

11 Claims, 4 Drawing Figures

3,742,620

METHOD FOR CONSTRUCTING THREE-DIMENSIONAL MODELS AND DEVICE THEREFOR

RELATED APPLICATION

This application is a continuation in part of my co-pending application Ser. No. 889,111, filed Dec. 30, 1969 now abandoned.

FIELD OF THE INVENTION

Map and model construction methods.

DESCRIPTION OF THE PRIOR ART

In the teaching of young children it is common practice to promote and stimulate the power of observation, the imaginative power, and the accurateness of observation of a child, by having the child produce from a molding mass, e.g. molding sand, peat dust, clay or a similar material, an object which the child has previously observed, or an object to which the attention of the child has been especially drawn by a teacher during a walk out-of-doors, or an object which the child has generated from its own imagination or phantasy.

However, it is desirable to provide a method by which a child at a very early age can make itself in an easy way familiar with the forming of a three-dimensional model of a two-dimensional representation and vice-versa. Thus, the child may gain insight and understanding of the concept that a flat map, for example, never represents the true, actual image of the terrain depicted on the two-dimensional map, and conversly that the representations on a flat map have actual three-dimensional meaning.

SUMMARY OF THE INVENTION

In accordance with the foregoing, the method of the present invention for making a three-dimensional model from an actual object having portions of differing heights, may include the steps of supporting a transparent cover plate over and displaced from the actual object; producing either singly or all at substantially the same time, a plurality of transferable contour lines on the transparent plate cover, each of the contour lines overlying portions of said actual object of substantially the same height, and the transferable contour lines being produced of a material readily transferable to and receivable by a transfer material; transferring each of the contour lines to a separate piece of transfer material by pressing each piece of transfer material into engagement with the transparent plate cover to cause at least a visible amount the material of which one of the contour lines is produced to be transferred to and received by transfer material; removing the portion of each separate piece of transfer material lying outside of the contour line transferred thereto; stacking the pieces of transfer material on top of each other vertically with the separate pieces of transfer material being arranged vertically in accordance with the corresponding heights of the actual object represented by the respective contour lines transferred to the pieces of transfer material; and orienting the stacked pieces of transfer material horizontally in accordance with the horizontal positionment of that portion of the actual object represented by the respective contour lines tranferred to the stacked pieces of transfer material.

DESCRIPTION OF THE PREFERRED EMBODIMENTS

Figure 1:
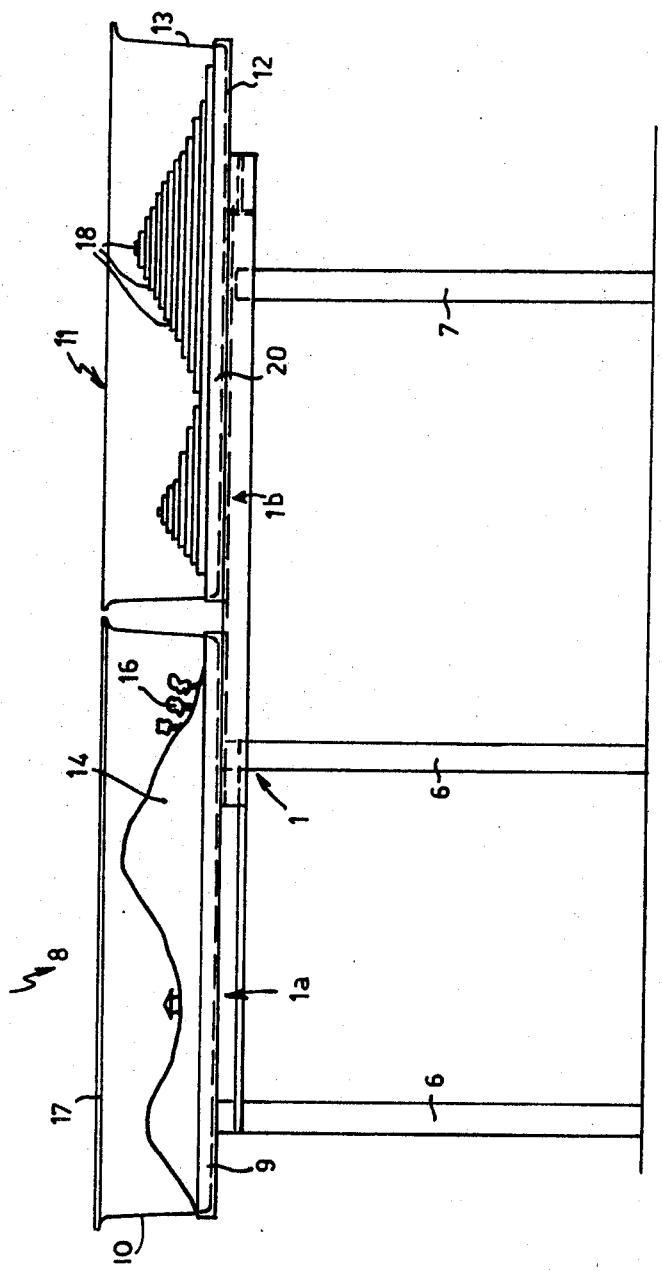
FIG. 1 is a side elevational view of the apparatus of the present invention including a box for containing a model of a landscape, a box for constructing a contour model of said landscape, and a stand for supporting said boxes side by side.
Figure 2:
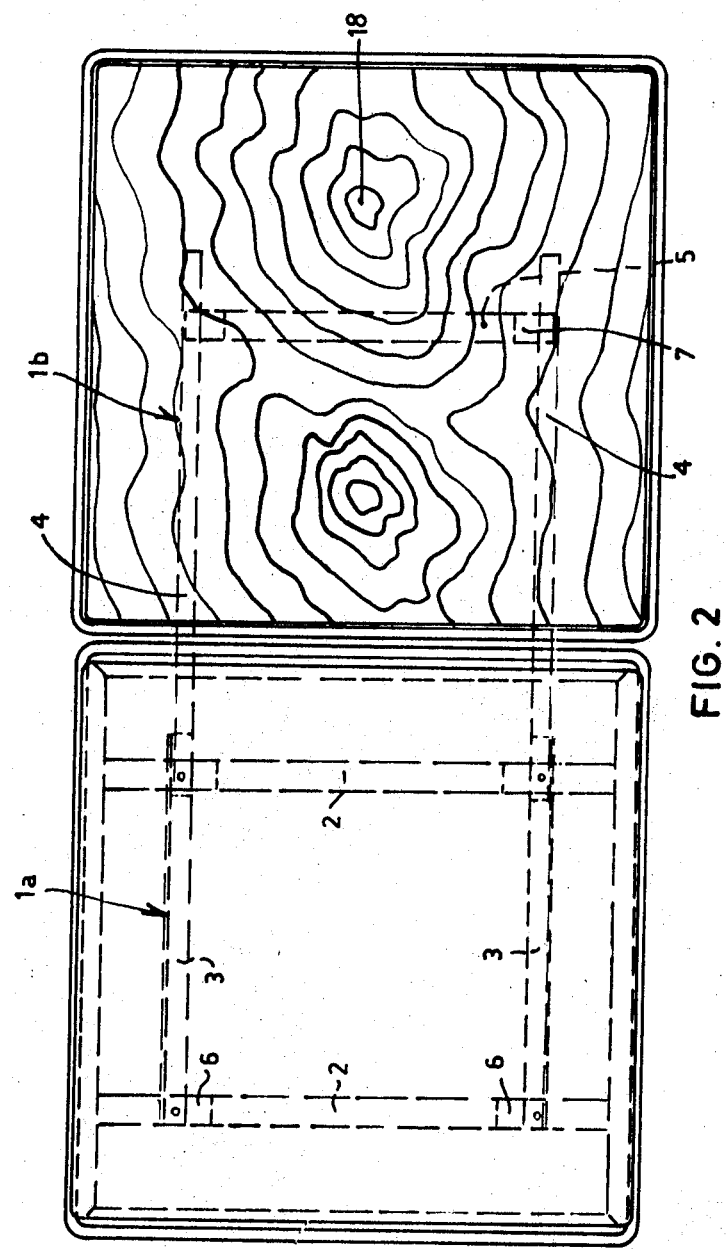
FIG. 2 is a plan view of the top of the apparatus of FIG. 1, the model of the landscape being left out for clearness sake.
Figure 4:
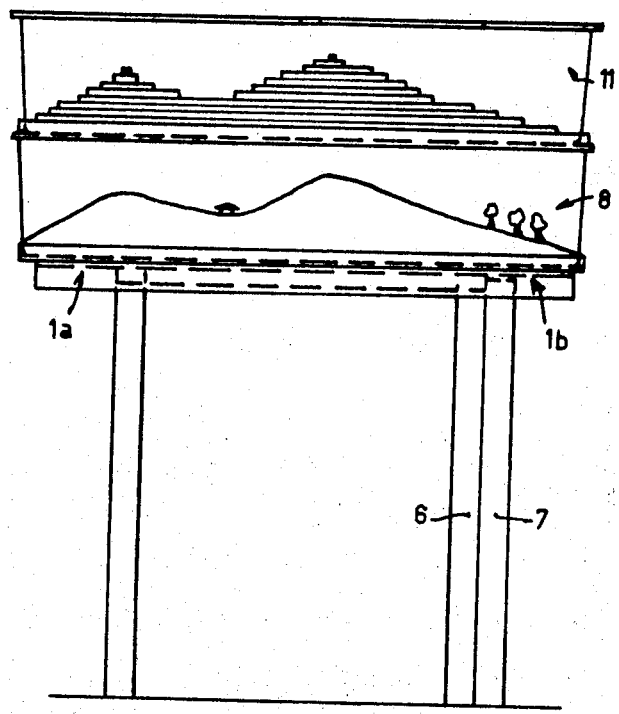
FIG. 4 is a side elevationa view of the apparatus of FIG. 1 wherein the box containing the contour model is located on top of the box containing the landscape model.
Figure 3:
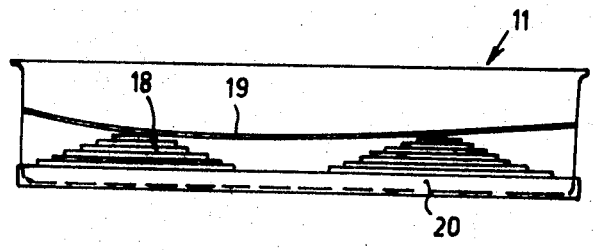
FIG. 3 is a side elevational view of a portion of the apparatus of FIG. 1, namely the box for constructing the contour model.

Referring now to FIG. 1, there is shown a horizontal rectangular frame 1 consisting of two parts, part 1a, and part 1b. Part 1a consists of two parallel fillets 2 and two L-shaped bars 3, said bars 3 being parallel to each other and connected at each end th-reof to fillets 2 in order to provide a rectangular frame.

Part 1b consists of a substantially U-shaped frame constructed of 2 parallel fillets 4 spaced apart a slightly shorter distance as connecting means 3, and a transverse fillet 5, said fillet 5 being connected at the ends thereof to parallel fillets 4 and at right angles to said fillets 4. The apparatus further comprises at least four vertical support posts 6, one each being placed at the juncture of fillets 2 and connecting means 3.

There are further provided 2 vertical support means 7. In the apparatus as normally set up, the ends of fillets 4 opposite to the ends connected by fillets 5, rest upon the horizontal portion of L-shaped connecting means 3. The junctures of fillets 4 and fillet 5 rest upon support means 7 thus frame portion 1b is supported in part by frame portion 1a but may be slidably removed therefrom.

The apparatus further comprises a molding box 8. Said molding box 8 comprises a base plate 9, which is suitably but not critically, square in surface area and a circumferential substantially vertical side wall 10. In the preferred modification of this invention side wall 10 and if desired, base plate 9, are of substantially rigid substantially transparent material. Suitably a plastic such as polyvinyl chloride may be utilized. However, the material of which box 8 is constructed is not critical to the present invention.

The apparatus further comprises a similar box 11 of similar dimensions, having a base plate 12 and circumferential side walls 13. In the preferred modification base plate 12 and side walls 13 are also transparent.

It is especially preferred that boxes 8 and 11 are interchangeable in terms of dimension and construction.

The apparatus further comprises a rigid, transparent, cover plate 17 having dimensions substantially equal to or slightly larger than, but not less than the surface area defined by circumferential wall 10.

In the operation of the apparatus described herein, molding box 8 is placed on part 1a of the frame 1 and box 11 is placed on part 1b of frame 1. A model of a landscape, 14, is constructed in molding box 8 utilizing clay, sand, plaster, or any readily available molding material. It is helpful, though not essential, that molding box 8 at this time, rests upon frame portion 1a.

Cover plate 17 is then placed over modling box 8. The model 14 thus constructed is then viewable through cover plate 17. Contour lines joining points of equal elevation on model 14 are then drawn upon plate 17. Any material which is readily transferable from the plate to a receiving surface by contact and the application of very slight pressure may be utilized for the purpose of drawing contour lines. There may be utilized chalks, slightly adhesive powders, or slow drying inks, dispensable from any suitable means known in the art. If desired, each contour line may be drawn in a different color, although using different colors has certain advantages, the use of different colors is not critical to the invention.

For reasons which will appear hereinbelow, the contour lines may be drawn singly, that is to say a contour line is drawn, transferred to the transfer receiving material, and then another contour line is drawn and similarly transferred, or all contour lines may be drawn at the same time. Where chalk is utilized, it is generally preferred to draw the contour lines singly, however, where a material capable readily giving multiple impressions, such as a slow drying printing ink, or the like, is utilized to draw the contour lines, they may all be drawn at the same time.

The contour lines are then transferred to a suitable transfer receiving material. The nature of the receiving material is not critical to one aspect of the present invention. It is preferred however, that substantial thicknesses that is to say, thicknesses of the order of 0.5 to 5 centimeters of material suitably about 1 centimeter of material which can be readily cut be used. Thus included within the scope of utilizable materials are very soft woods, such as balsa wood, corrugated cardboard, and rigid and compressible foamed materials such as foamed rubbers, or foamed plastics. The transfer receiving material is utilized in flat slabs of the thickness mentioned hereinabove. When the contour line has been drawn, the transparent plate 17 is placed in contact with the transfer receiving material or vice versa, slight pressure applied thereto whereby a certain amount of the transfer material is transferred from plate 17 to the transfer receiving material providing an outline of the contour line upon the transfer receiving material. The slab upon which the contour line is now imprinted is then cut along the contour line and the material lying outside the contour line is discarded. This imprinting procedure is repeated until each contour line has been transferred onto at least one slab of transfer receiving material. Each slab of receiving material is cut at a predetermined contour line to provide a slab 18 having the outline of said contour line.

It will be clear that where several contour lines are drawn at the same time on transfer plate 17, all of the contour lines will be transferred to a given plate of transfer receiving material. A given predetermined contour line on that slab of transfer receiving material is selected and the material lying outside said predetermined contour line is discarded.

It will be clear to those skilled in the art, that where a material such as chalk or the like is utilized for outlining the contour lines, only a few transfers will be possible before the transfer material no longer causes a visible image upon the transfer receiving material. Where such material, such as chalk, is utilized, it is generally preferred to draw one contour level line at a time, make the imprint transfer unto one piece of transfer receiving material, and repeat the process for each subsequent contour line.

On the other hand, where a slow drying ink, such as slow drying printing ink, is utilized, which has the ability to make the multiple impressions, it is possible to draw all or substantially all contour lines at the same time and make impressions on several sheets of transfer receiving material.

It has been found helpful, though it is by no means critical to the invention, to utilize different colors either in defining adjacent the contour lines upon plate 17, or for the material of the adjacent contour slabs themselves.

When all contour lines have been drawn, and the contour slabs 18 cut to provide the required level outlines, box 11 is placed next to box 8 on the frame 1 and the said contour slabs 18 are assembled in box 11 placing the slabs corresponding to the lowest contour lines on the bottom of the box 11 and the higher contour slabs respectively thereupon in the proper horizontal alignment. There is thus provided in box 11 a contour slab representation of the model in box 8, which viewed from the side may demonstrate the elevational effect or viewed from the top may demonstrate the relationship of the contour lines to the original model 14.

In a further modification of the present invention, the transfer receiving material is a readily compressible foamed material, most preferably of low density and having a fine pore structure. The model is then constructed as before.

There is also provided in this modification, a press plate 19 constructed of transparent, substantially rigid, but slightly flexible material, having external dimensions of the same order, but slightly less, then that defined by a plan view of box 11. It has been found desirable to construct this press plate of a plastic material, such as polyvinyl chloride, preferably, but not limited to, a thickness of the order of 0.2 to 1 centimeter suitably about 0.5 centimeter. The press plate 19 is then laid upon the foam slab model in box 11 and pressure applied thereto. The pressure upon plate 19 causes the foam model to be compressed into substantially though not of course absolutely, two-dimensional representation. Thus when viewed from the side, the foam model is substantially flat whereas when viewed from the top, through press plate 19, particularly if adjacent slabs 18 are of different color, then there appears a clear two-dimensional, contour representation, of the adjacent model 14.

The apparatus and method clearly demonstrates the inter-relationship of two- and three-dimensional representation of a solid topographical landscape model.

In the further modification of the immediately above described embodiments of the present invention, a readily compressible foam layer, 20, is placed upon base plate 12 of box 11 and the contour slabs laid thereupon. This mode of proceeding has been found to aid the compressibility of the model as a whole.

Since the material of which model 14 is constructed is cheap and disposable, and since plate 17 may be cleaned off after the drawing of each set of contour lines, the above described method provides the opportunity for many children, in one class, in a short space of time, to view and practice the process of the present invention in order to lear the relationship of two- and three-dimensional representations.

I claim:

1. Method of preparing a three-dimensional model from an actual object having portions of differeing heights, comprising the steps of:

supporting a transparent cover plate over and displaced vertically from said actual object;

producing at least one transferable contour line on said transparent cover plate, each of said contour lines overlying portions of said actual object of substantially the same height, and said transferable contour lines being produced of a transfer material readily transferable to and receivable by a transfer receiving material;

transferring each of said contour lines to a plurality of separate pieces of transfer receiving material corresponding to at least a number of different contour levels by pressing each piece of transfer receiving material into engagement with said transparent plate cover to cause the material of which said contour lines is produced to be transferred to and received by said pieces of transfer receiving material;

removing the portion of each separate piece of transfer receiving material lying outside of a different predetermined contour line transferred thereto until there are produced separate pieces of transfer receiving material each of which has the outer boundary thereof defined by a different predetermined one of said contour lines;

subsequently, stacking said pieces of transfer receiving material on top of each other vertically with the separate pieces of transfer receiving material being arranged vertically from bottom to top, in accordance with the corresponding increasing heights of the actual object represented by the respective contour lines transferred to the pieces of transfer receiving material; and orienting said stacked pieces of transfer receiving material horizontally in accordance with the horizontal positionment of that portion of the actual object represented by the respective contour lines transferred to the stacked pieces of transfer receiving material.

2. A method of claim 1 which comprises producing a plurality of contour lines of said transparent cover plate prior to transferring said transfer material onto a plurality of pieces of transfer receiving material.

3. A method of claim 1 comprising producing only one contour line at one time.

4. A method of claim 1 comprising utilizing transfer material having a predetermined color to produce a given contour line and utilizing a transfer material having a different predetermined color to produce the contour line adjacent thereto.

5. A method according to claim 1 comprising utilizing transfer receiving material having a predetermined color to produce a given contour level and utilizing a transfer receiving material having a different predetermined color to produce the contour level adjacent thereto.

6. A method according to claim 1 comprising utilizing a compressible transfer receiving material.

7. A method according to claim 6 comprising utilizing transfer receiving material constructed of fine pore, low density, foam material.

8. A method according to claim 1 comprising utilizing transfer material selected from a material capable of producing multiple impressions.

9. A method according to claim 8 comprising utilizing a slow drying ink as the transfer material.

10. A method according to claim 1 comprising utilizing chalk as the transfer material.

11. A method according to claim 1 additionally comprising the step of placing a compressible layer below the slab of transfer receiving material corresponding to the lowest contour level.

* * * * *